United States Patent [19]

Hausslein et al.

[11] 4,171,898
[45] Oct. 23, 1979

[54] FILM CASSETTE PROCESSOR HAVING REVERSE INCLINED DOCTOR BLADE

[75] Inventors: Robert W. Hausslein, Lexington; Paul B. Mason, Magnolia, both of Mass.

[73] Assignee: Polaroid Corporation, Cambridge, Mass.

[21] Appl. No.: 957,979

[22] Filed: Nov. 6, 1978

[51] Int. Cl.² .................. G03D 5/00; G03C 11/00
[52] U.S. Cl. ......................... 354/317; 352/78 R; 352/130
[58] Field of Search .............. 352/72, 78 R, 130; 354/317

[56] References Cited

U.S. PATENT DOCUMENTS

| | | | |
|---|---|---|---|
| 3,871,013 | 3/1975 | Burke et al. | 354/317 |
| 3,887,272 | 6/1975 | Weed | 352/130 |
| 3,951,530 | 4/1976 | Czumak et al. | 352/130 |
| 4,119,371 | 10/1978 | Stella | 352/130 |

*Primary Examiner*—Monroe H. Hayes

*Attorney, Agent, or Firm*—Leslie J. Payne

[57] ABSTRACT

A doctoring surface conformation for applicator nozzle structures in photographic film cassette contained processors by which a coating of processing fluid is deposited on exposed film strip moving in a given direction of film advancement. The conformation includes a first doctoring surface extending from adjacent a trailing portion of a nozzle opening, when viewed in the given direction, and converging in the given direction toward the film strip. Terminating by a given distance from the film strip is an edge of the first surface which enables such surface to trap particles of at least a predetermined size carried by such film strip. Contiguous with the terminating edge is a second doctoring surface which is constructed and oriented relative to the first surface and film strip so that the processing fluid remains in constant contact therewith for providing a preselected fluid thickness above the film strip which is greater than the given distance of the terminating edge for eliminating wakes in the fluid coating caused by particles being trapped by the first surface.

11 Claims, 3 Drawing Figures

FILM CASSETTE PROCESSOR HAVING REVERSE INCLINED DOCTOR BLADE

BACKGROUND OF THE INVENTION

1. Field of the Invention

This invention relates to photographic film processing apparatus and, more particularly, it concerns an improved doctoring surface conformation for use in an applicator nozzle structure for substantially eliminating the adverse effects on the processing fluid coating caused by particles trapped by a doctoring surface.

2. Description of the Prior Art

As a result of recent developments in the motion picture art, motion picture systems have been devised in which exposure, processing and projection operations are carried out on a photographic film strip contained at all times in a multipurpose cassette. Such a system has been disclosed in several U.S. patents, assigned in common with the present invention. In these cassettes a supply of light sensitive film can be exposed in a camera adapted to receive the cassette. Processing or developing of the exposed film, to provide the conventional series of positive transparent image frames, is achieved by merely placing the cassette in a player or processing and viewing apparatus capable of activating a processor contained in the cassette. During the processing mode, the exposed film is rewound and a coating or layer of processing fluid from the processor is deposited along the length of the film. After processing in this manner, the player apparatus is operated as a projector to advance the film incrementally, frame by frame, past a light source. As a result, the scene to which the film was exposed is capable of being reproduced on a screen.

While the advance in the motion picture art represented by such a system is apparent and needs no elaboration herein, it is critical to satisfactory performance of the system that the processing fluid must be deposited uniformly within extremely small tolerances over the emulsion layer on the film during processing. Failure to achieve such a uniform layer of processing fluid on the emulsion layer will result in undesirable blemishes. That is, the undesirable blemishes will be observed as undesirable streaks in the image viewed during projection of the processed film. It follows, therefore, that the achievement of a uniform layer or coating of processing fluid on the film during the processing operation has been a major focal point of attention in overall system development.

The current state of the art with respect to achieving a uniform coating of processing fluid on such cassette contained film strips is represented by the disclosures of U.S. Pat. No. 3,871,013 issued Mar. 11, 1975 to Edward F. Burke and Douglas B. Holmes, and U.S. Pat. No. 3,951,530 issued Apr. 20, 1976 to Frank M. Czumak, Paul B. Mason and Jospeh A. Stella, both of which patents are commonly assigned with the present invention. In the disclosures of these patents, an inclined doctoring surface is used to develop a positive hydrodynamic force in the deposited processing fluid traveling therepast to thereby hold the film in engagement with an underlying pressure pad. To provide a net balance of forces on opposite sides of the film, the pressure pad is operative to support the film beneath the doctoring surface.

Entry of foreign particles, such as dust, into the cassette interior arises by virtue of ventilation openings in the cassette. While the presence of such particles is not a serious problem to film strip exposure and projection, it is critical to proper film strip processing that foreign particles present on the film strip be prevented from accumulating in the region of the doctoring surface by which the processing fluid is spread uniformly onto the film strip. The achievement of a net balance of forces on opposite sides of the film strip as it passes the doctoring surface in accordance with the disclosure of the aforementioned issued U.S. patents has contributed substantially to the solution of this problem by permitting film strip carried particles to pass the doctoring surfaces without accumulation and without dragging or streaking the processing fluid in a manner to creat blemishes which will appear in the viewed images of the processed film strip. There remains, however a potential for wedging and accumulation of foreign particles as a result of the inclination of the doctoring surface which provides a narrowing gap between the doctoring surface and the film strip. Because of this potential, there is need for improvement.

Moreover, the problems of achieving a uniform layer or coating of processing fluid on the film strip during the processing operation are further compounded by the requirement that each once used cassette carry its own processor and further by the fact that the cassette and its components, including the processor, must be capable of mass production manufacturing techniques and the tolerance levels incident to such techniques for the system to be acceptable in a competitive commercial market. Accordingly, the structural organization of the means by which the processing fluid is distributed onto the film and the successful elimination of disturbances on coating uniformity caused by trapped particles is critical to the overall system in which the cassette is used.

SUMMARY OF THE INVENTION

In accordance with the present invention, the potential for problems regarding the coating of processing fluid from a cassette contained processor on the emulsion surface of film caused by dust or other foreign particles being trapped by a doctoring surface on a processor nozzle structure are substantially eliminated. Elimination is achieved by provision of a processing fluid applicator nozzle structure having a pair of sloped doctoring surfaces positioned downstream, in a given direction of film travel, of a nozzle opening through which the processing fluid is deposited on the film during rewind thereof. Extending from adjacent the downstream portion of the nozzle opening is a first doctoring surface. This first doctoring surface converges toward the emulsion surface in the given direction for providing a suitable hydrodynamic pressure gradient in the processing fluid traveling therepast. By reason of such a pressure gradient, a uniform distribution of processing fluid on the emulsion surface is facilitated. Terminating by a given distance from above the emulsion surface is an edge of the first surface which regulates coating thickness and which facilitates the trapping by the first surface of particles of at least predetermined size, carried by the film, when traveling in the given direction. Contiguous with the terminating edge is a second surface which is constructed and oriented to diverge from the film, in the given direction, so as to insure that the processing fluid generally remains in contact therewith so that a preselected fluid thickness, downstream of the trapped particles, can be reached which exceeds the distance the first terminating edge is above the emulsion layer. Owing to this relationship, wakes or disturbances in the processing fluid coating caused by particles being trapped by the first doctoring surface are substantially eliminated.

Among the objects of the invention are, therefore, the provision of an improved apparatus for the application of processing fluid to the emulsion side of the photographic film strip; the provision of an improved processor for film strips contained in multipurpose film cassettes; the provision of an improved applicator nozzle structure having doctoring surfaces for substantially eliminating the adverse effects of trapped foreign particles on the uniformity of the processing fluid coating; and the provision of such a nozzle structure capable of manufacture at practical costs for a once used component in a mass produced film cassette.

Other objects and further scope of applicability of the present invention will become apparent from the detailed description to follow when taken in conjunction with the accompanying drawings in which like parts are designated by like reference numerals.

DETAILED DESCRIPTION OF THE PREFERRED EMBODIMENT

Figure 1:
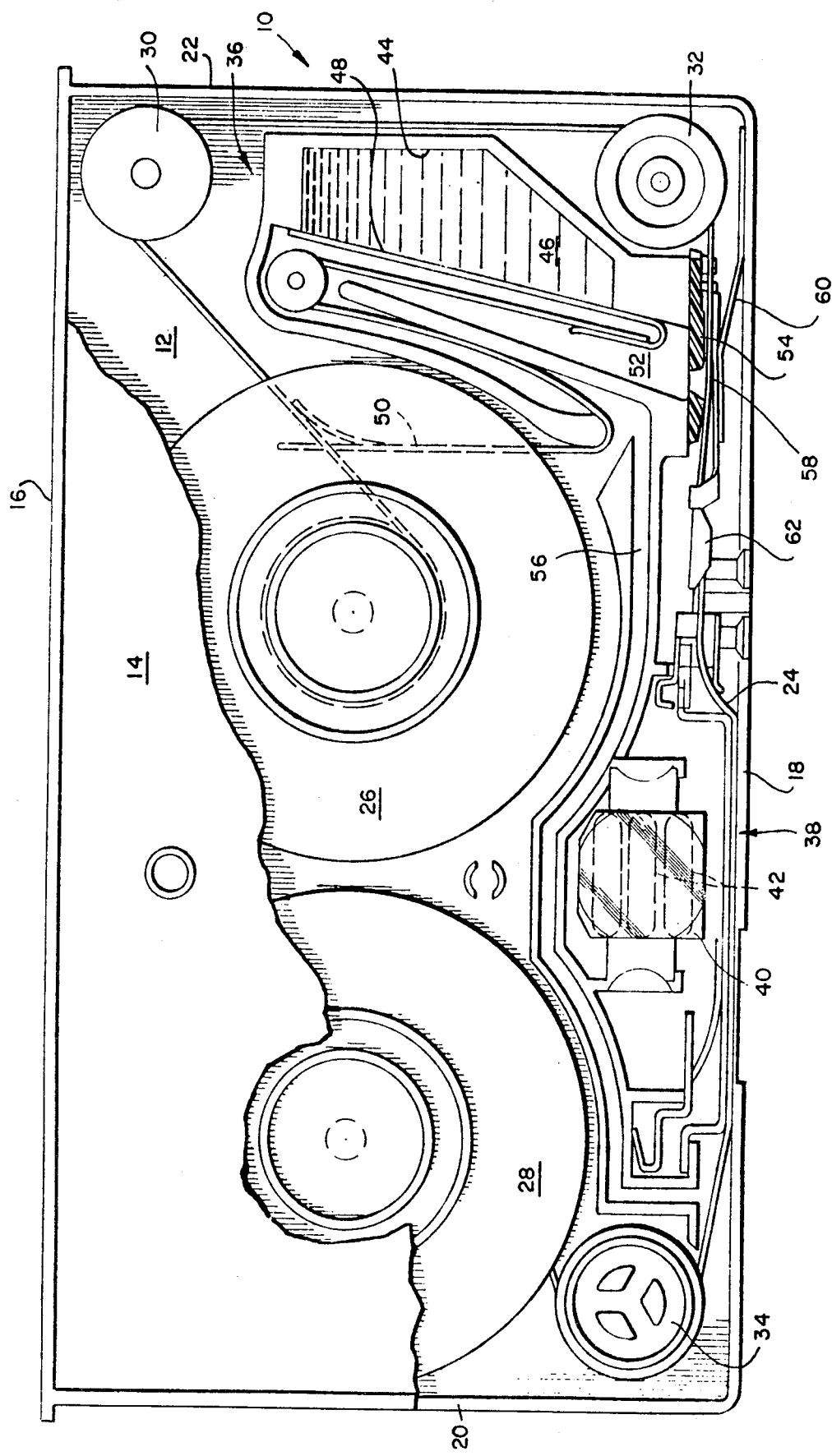
FIG. 1 is a side elevation view, partially broken away and partially in cross section, illustrating the interior arrangement of a photographic film cassette incorporating the improvements of the present invention.

In FIG. 1 of the drawings a multipurpose film cassette incorporating the present invention is shown to include a housing generally designated by the reference numeral 10. In this embodiment, the housing 10 takes the form of a rectangular parallelepiped having a pair of exterior side walls 12 and 14 which is connected by top, bottom and end walls 16, 18, 20 and 22, respectively. Within the housing 10, a film strip 24 is connected at opposite ends to supply and takeup spools 26 and 28 for movement through a series of linear flights or runs defined by a bobulator roller 30, an idler guide roller 32 and a snubbing roller 34. When the film strip 24 runs between the guide roller 32 and the snubbing roller 34, in passing from the supply spool 26 to the take-up spool 28, it traverses a processor 36 and an exposure/projection aperture 38 in the bottom housing wall 18 under a reflecting prism 40 located adjacent ventilating openings 42 in the side wall 12.

Included in the processor 36 is a reservoir or pod 44 of processing fluid 46 initially sealed by a tear strip 48 which is connected to a film strip engaging pull strip 50. It is pointed out that the construction and operation of the pull strip 50 is fully disclosed in U.S. Pat. No. 3,895,862 issued July 22, 1975 to Joseph A. Stella et al. Therefore, the pull strip 50 need not be further described here except to note that upon initiation of a processing cycle, it becomes engaged by an aperture (not shown) in the end portion of the film strip 24 to pull the tear strip 48 away from the pod or reservoir 44. As a result, the processing fluid 46 is allowed to flow into a chamber 52 closed at its bottom by an applicator nozzle 54 hereinafter described in more detail. At the completion of tear strip removal, the pull strip 50 becomes wound between the convolutions of the film strip 24 on the supply spool 26, whereas the tear strip 48 becomes separated and remains in a storage chamber 56.

Also in accordance with the disclosures of prior patents, including those mentioned above, the run of the film strip 24 between the rollers 32 and 34 is situated between the bottom of the nozzle 54 and a pressure pad 58 biased upwardly by a spring 60 supported in the bottom wall 18 of the housing 10. Positioned upstream of the nozzle 54 (in the context of film strip travel during processing) is a valve member 62 which is engageable by a necked-down portion (not shown) in the leading end portion of the film strip 24 so as to be advanced from the position shown to a position, not shown, underlying the nozzle 54 at the end of a processing cycle.

The general organization of cassette components illustrated in FIG. 1 as well as the operation of such components during exposure, processing and projection of the film strip 24, without removal thereof from the housing 10, is summarized herein principally for the purpose of providing an understanding of the environment in which the improved structure of the nozzle 54 is used. Although the housing 10 constitutes an essentially light-tight enclosure for the film strip 24, openings such as the ventilation openings 42 and the exposure/projection aperture 38, which are important to overall system operation, prevent exclusion of foreign particles, such as dust to the housing interior.

While the effect of foreign particles on the film strip 24 or otherwise within the cassette interior, during use of the cassette to expose the film strip or to project the transparent image frames formed thereon after processing, is not significantly different than it is on conventional exposure or projection of motion picture film strips, it is important to completely satisfactory operation of the processor 36 that such foreign particles not interfere with the achievement of a uniform layer of the processing fluid 46 on the exposed emulsion layer of the film strip.

Figure 2:
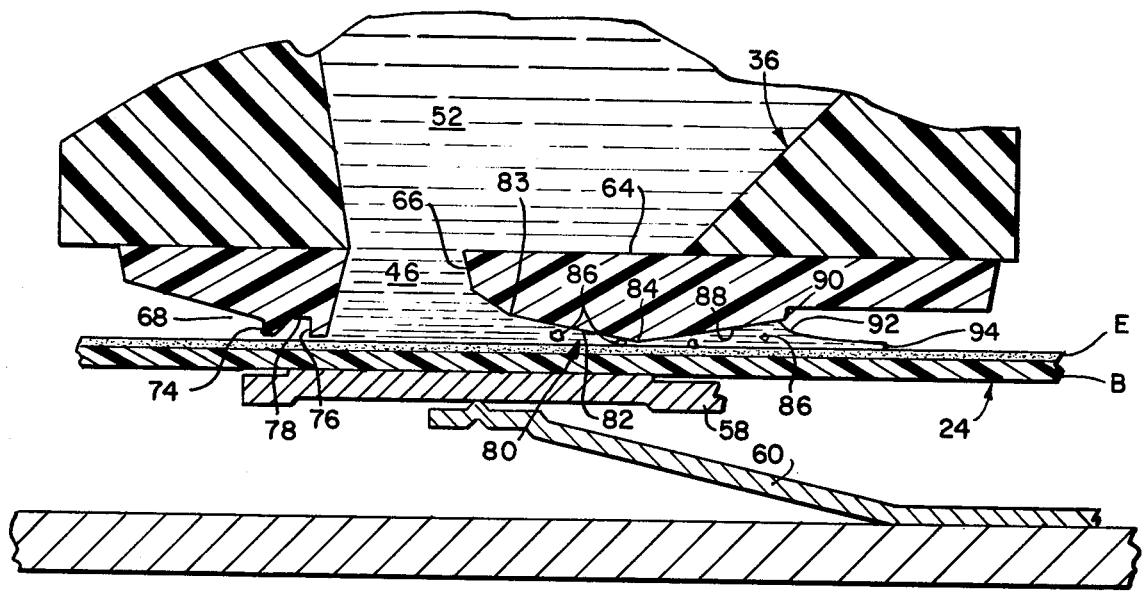
FIG. 2 is an enlarged, fragmentary view, partly in cross section, illustrating the operative components by which a layer of processing fluid is deposited on a photographic film strip.
Figure 3:
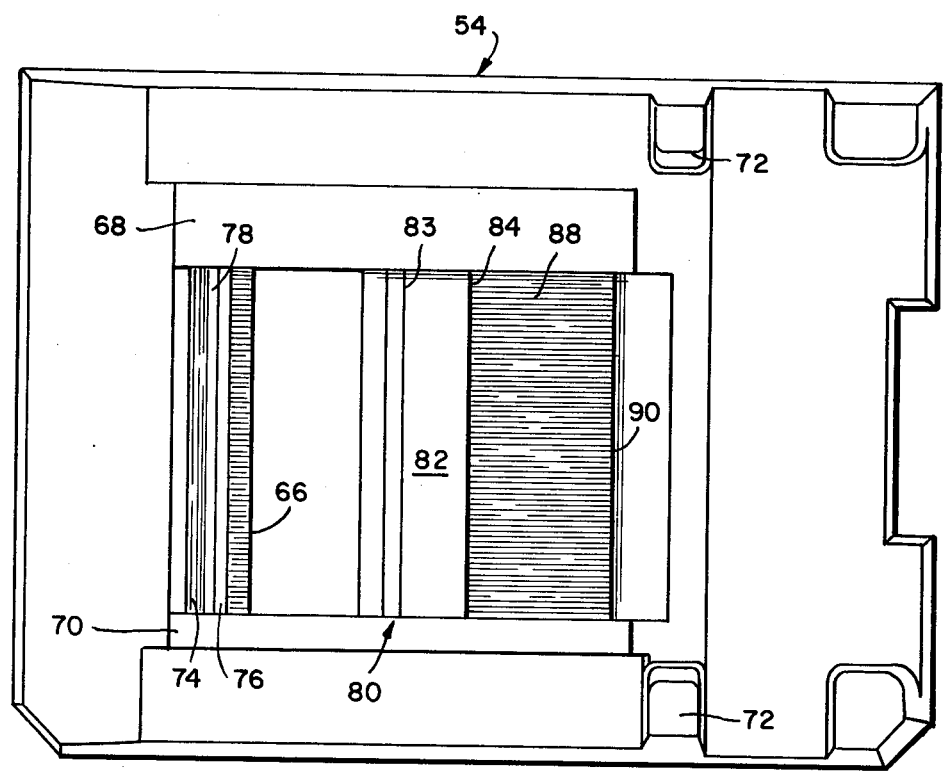
FIG. 3 is an enlarged, bottom plan of view of the processor nozzle incorporating the improvements of this invention.

An understanding of the improved nozzle structure of the preferred embodiment and its use in operation may be gained by continued reference to the drawings, in particular FIGS. 2 and 3. In this embodiment, the nozzle 54 is an integral molding of suitable synthetic resinous material having an essentially planar top surface 64. Extending from top to bottom of the nozzle 54 is a generally rectangular nozzle opening 66 through which the processing fluid 46 is deposited onto the upper surface of an emulsion layer E carried by and extending across the width of a carrier base B of the film strip 24.

In FIG. 3 the surface configuration of the underside of the nozzle 54 presented to the film strip 24 is shown to include elongated planar guide tracks 68 and 70 located on the opposite side or lateral edges of the nozzle opening 66 and having overlying relation to the longitudinal margins of the film strip 24 so as to make sliding contact with the emulsion layer E. As a result, the plane of the nozzle opening 66 is elevated above the upper surface of the emulsion layer E by a suitable distance. Since one longitudinal margin of the film strip 24 is larger than the other, the guide track 68 is wider than the guide track 70 so as to accommodate feed apertures (not shown) in the film strip. Depending from the underside of the nozzle 54 is a pair of post-like abutments 72 which function to laterally guide the film strip 24 past the nozzle 54 and also act as stops for the valve member 62.

As best shown in FIGS. 2 and 3, the nozzle 54, to the left of the nozzle opening 66 or upstream from the nozzle opening (in terms of film strip travel during processing) is provided with a pair of transversely extending linear projections or scraper blade formations 74 and 76 spaced longitudinally by a transverse recess 78. Such scraper blade formations 74 and 76 terminate in planar bottom surfaces which are elevated from the bottom surface of the guide tracks 68 and 70 by a distance, preferably, on the order of 0.0001 inch, but may approach zero or to a point where the bottom surfaces of the scraper blade formations are truly flush with the surface of the guide tracks 68 and 70. Such a scraper blade formation serves to prevent passage of a large proportion of dirt and debris carried by the film strip 24 into the region of the nozzle opening 66.

With continued reference to FIGS. 2 and 3, the doctoring surface conformation 80 on the nozzle 54 is located downstream of the nozzle opening 66; as viewed in the context of film strip advancement during rewinding or processing. As best illustrated in FIG. 2, the doctoring surface conformation 80 includes a first generally planar, inclined doctoring surface 82, transversely extending between the guide tracks 68 and 70, and which uniformly and continuously extends from a leading edge 83, adjacent and downstream of the nozzle opening 66, to an edge 84 terminating above the upper surface of the emulsion layer E by a preselected distance. As a result of this sloping relationship, the first doctoring surface 82 is capable of trapping particles 86 of at least predetermined size. Also, as a result of the construction and orientation of the first doctoring surface 82, a desired positive hydrodynamic pressure gradient is developed in the processing fluid 46 passing therepast which increases in the rewind direction of film strip advancement. Owing to this arrangement, the processing fluid 46 is enabled to be spread substantially uniformly across the emulsion layer E between the longitudinal margins of the film strip 24. It will be appreciated that the hydrodynamic forces developed by the first doctoring surface 82 will be a function of its length and inclination, as well as the viscosity of the processing fluid, the velocity of film travel relative to the doctoring surface 82 and the distance the terminating edge 84 is from the emulsion layer E.

In use particles 86 which are trapped by the first doctoring surface 82 would normally cause wakes or streaking of the deposited layer of processing fluid downstream of such particles.

Such problems are, however, overcome by a second doctoring surface 88 extending transversely between guide tracks 68 and 70. As constructed, the second doctoring surface 88 is contiguous with and extends from the terminating edge 84 in a direction which angularly diverges from the emulsion layer E, as seen in FIG. 2. A terminating edge 90 of the second doctoring surface 88 is spaced from the upper surface of the emulsion layer E by a preselected distance. Such distance is, of course, greater than the distance the terminating edge 84 is from the emulsion layer E. Owing to the inclination and length of the second doctoring surface 88, the processing fluid 46 continuously remains in contact therewith without breaking until a predetermined thickness of such fluid is established on the emulsion layer E, at which point a bead 92 breaks and gradually descends until a suitable coating thickness is reached on the emulsion layer E in a known manner. By reason of this increased thickness of processing fluid caused by the second doctoring surface 88, the possibility of wakes in the coating of the processing fluid 46 is substantially eliminated. It will be appreciated that the length of the second doctoring surface 88, as well as its inclination relative to the plane of the run of the film strip 24 passing beneath the guide tracks 68 and 70, is regulated in accordance with the viscosity of the processing fluid 46 and the relative speed thereof so that the fluid remains in continuous and uniform contact with the second doctoring surface until the preselected thickness is reached. In this manner, the processing fluid bead 92 can continuously and uniformly reach the desired thickness necessary to substantially eliminate wakes caused by trapped particles.

The following dimensions are given, by way of example, for purposes of illustration only and, hence, are not intended to be restrictive or limiting. In practice of this invention, the leading edge 83 is spaced from the upper surface of the emulsion layer E by a distance of approximately 0.0007 in.; the terminating edge 84 is spaced from the upper surface of the emulsion layer E by a distance of approximately 0.0006 in.; while the terminating edge 90 is spaced from the upper surface of the emulsion layer E by a distance of approximately 0.0008 in. It will be appreciated that the thickness of the processing fluid 46 at the bead 92 exceeds that traveling past terminating edge 84. Also, it should be pointed out that the second doctoring surface 88 diverges from the plane of the bottom of the guide tracks 68 and 70 by an angle of about 4 minutes. The depicted angle of divergence has been exaggerated for the purpose of enabling a better understanding of this invention. Other divergence angles less than 5° and preferably in the order of 10 minutes or less, for example, about 5 minutes, are contemplated. Since divergence angles which are larger can produce meniscus instability, where the processing fluid bead 92 will non-uniformly break from the surface 88 and result in a non-uniform coating, the maximum angle must be restricted.

In operation of the cassette, the film strip 24, as supplied in its unexposed condition, will be contained entirely on the supply spool 26 with a leader extending about the rollers 30, 32 and 34 to the take-up spool 28. The cassette is constructed to be placed within a camera (not shown) adapted to receive and operate the same. Operation of the camera will result in the film strip 24 being incrementally advanced past the pressure pad 54 and the aperture opening 38 to the take-up spool 28. After the film strip 24 has been completely exposed in the camera, the cassette is inserted in a specially constructed player apparatus (not shown) which is operable in either a processing mode or a projecting mode and equipped with means cooperable with the various operating components of the cassette to operate the latter.

Assuming the exposed film strip 24 has not been processed, the player is operated so that the pull strip 50 becomes engaged by an aperture (not shown) in the trailing end portion of the film strip 24 to pull the tear strip 48 away from the pod or reservoir 44. As a result, the processing fluid 46 flows through the chamber 52 and the nozzle opening 66. At the completion of tear strip removal, the pull strip 50 becomes wound between the convolutions of the film strip 24 wrapped on the supply spool 26, whereas the tear strip 48 becomes separated to remain in the storage chamber 56. As a result of the processing fluid 46 flowing through the nozzle opening 66, the emulsion layer E will have deposited thereon such fluid.

Referring once again to FIG. 2, it will be observed that particles 86 of at least a predetermined size can be trapped by the first doctoring surface 82. Any particles so trapped will, however, not create wakes in the fluid downstream thereof. This is due to the second doctoring surface 88 continuously diverging away from the upper surface of the emulsion layer E by a distance which exceeds the distance of the terminating edge 84 from the upper surface of the emulsion layer E. This insures substantial elimination of wakes, thereby enabling the achievement of the coating uniformity needed for desired processing and viewing of the processed film.

Thus it will be appreciated that as a result of this invention, an improved nozzle structure is provided for photographic film strip processors and by which the above-mentioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a film cassette containing an elongated strip of photographic film having a light sensitive emulsion on one surface thereof and containing a processor operative to deposit a layer of processing fluid on at least the emulsion surface located intermediate the longitudinal margins of the film during advancement of the film in a given direction of film advancement, the processor including a nozzle member positioned relative to an advancing run of the film and having a nozzle opening through which the fluid may be initially introduced into engagement with the film to provide the processing fluid on the emulsion surface, the nozzle opening having a leading portion and a trailing portion, the trailing portion being spaced from the leading portion in the given direction, the improvement comprising:
    a first doctoring surface on the nozzle member extending from adjacent the trailing portion of the nozzle opening and converging toward the film in said given direction for producing positive hydrodynamic forces in the fluid flowing therepast which increases in said given direction so as to facilitate uniform deposition of the fluid on the emulsion surface, said first surface extending to an edge spaced a given distance from the emulsion surface to thereby facilitate trapping particles of at least a predetermined size carried by the film; and
    a second doctoring surface on the nozzle member extending from at least adjacent said first doctoring surface and diverging from the film in said given direction in a manner so as to insure that the fluid generally remains in contact therewith to provide a preselected fluid thickness greater than said given distance, so that such thickness is sufficient to substantially eliminate wakes in the fluid caused by particles being trapped by said first doctoring surface.

2. The apparatus recited in claim 1 wherein said second doctoring surface is contiguous with said edge of said first doctoring surface.

3. The apparatus recited in claims 1 or 2 wherein said second doctoring surface angularly diverges away from the emulsion surface by about less than 5 degrees.

4. The apparatus recited in claims 1 or 2 wherein said second doctoring surface angularly diverges from the emulsion surface by about less than 10 minutes.

5. The apparatus recited in claim 2 wherein said first doctoring surface edge terminates above the emulsion surface by a distance on the order of about 0.0006 inch.

6. In a processing fluid applicator for multipurpose photographic film cassettes containing an elongated strip of photographic film having a light sensitive emulsion on one surface thereof, said applicator containing a supply of processing fluid operative to be deposited on at least the emulsion surface of the film intermediate the longitudinal film margins during a moving run of the film which is urged in a given direction of film advancement and a nozzle member having a nozzle opening through which the processing fluid may be initially introduced into engagement with the emulsion surface, the nozzle opening having a leading portion and trailing portion, the trailing portion being spaced from the leading portion in said given direction, the improvement comprising:
    a first doctoring surface on the nozzle member extending from adjacent the trailing portion of the nozzle opening and converging toward the film in said given direction for producing positive hydrodynamic forces in the fluid flowing therepast so as to facilitate uniform deposition of the fluid on the emulsion surface, said first surface extending to a given distance from the emulsion surface to thereby facilitate trapping particles of at least a predetermined size carried by the film; and
    a second doctoring surface on the nozzle member extending from at least adjacent said first doctoring surface and diverging from the film in said given direction in a manner so as to insure that the fluid generally remains in contact therewith to provide a preselected fluid thickness greater than said given distance, so that such preselected fluid thickness is sufficient to substantially eliminate wakes in the fluid caused by particles being trapped by said first doctoring surface.

7. In a processing fluid applicator for an elongated strip of photographic film having a light sensitive emulsion on one surface thereof, said applicator being operative to deposit a supply of processing fluid on at least the emulsion surface of the film intermediate the longitudinal film margins during a moving run of the film which is urged in a given direction of film advancement and including a nozzle member having a nozzle opening through which the processing fluid may be initially introduced into engagement with the emulsion surface, the nozzle opening having a leading portion and trailing portion, the trailing portion being spaced from the leading portion in said given direction, the improvement comprising:
    a first doctoring surface on the nozzle member extending from adjacent the trailing portion of the nozzle opening and converging toward the film in said given direction for producing positive hydrodynamic forces in the fluid flowing therepast which increase in said given direction so as to facilitate uniform deposition of the fluid on the emulsion surface, said first surface extending to an edge spaced a given distance from the emulsion surface to thereby facilitate trapping particles of at least a predetermined size carried by the film; and second doctoring surface on the nozzle member at least adjacent said first doctoring surface and diverging from the film in said given direction in a manner so as to insure that the fluid uniformly and continuously remains in contact therewith to provide a preselected fluid thickness greater than said given distance so that such preselected thickness is sufficient to substantially eliminate wakes in the fluid caused by particles being trapped by said first doctoring surface.

8. The applicator recited in claim 6 wherein said doctoring surface is contiguous with and extends from said edge of said first doctoring surface.

9. The applicator recited in claims 7 or 8 wherein said second doctoring surface angularly diverges away from the emulsion surface by about less than 5 degrees.

10. The applicator recited in claims 7 or 8 wherein said second doctoring surface angularly diverges from the emulsion surface by an angle of about less than 10 minutes.

11. The applicator recited in claim 8 wherein said first doctoring surface edge terminates above the emulsion surface by a distance on the order of about 0.0006 inch.

* * * * *